Oct. 18, 1949.                F. DE FREMERY                2,485,365
           METHOD OF DIRECTION FINDING BY MEANS
                OF ROTATING RADIO BEACONS
Filed Feb. 11, 1947                              2 Sheets-Sheet 1
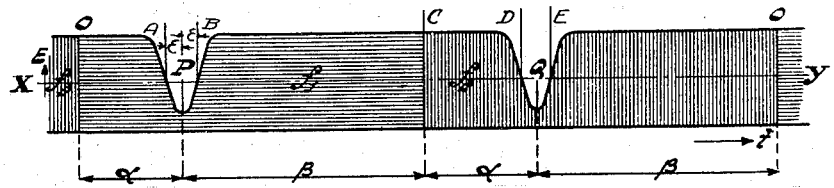
Fig. 1
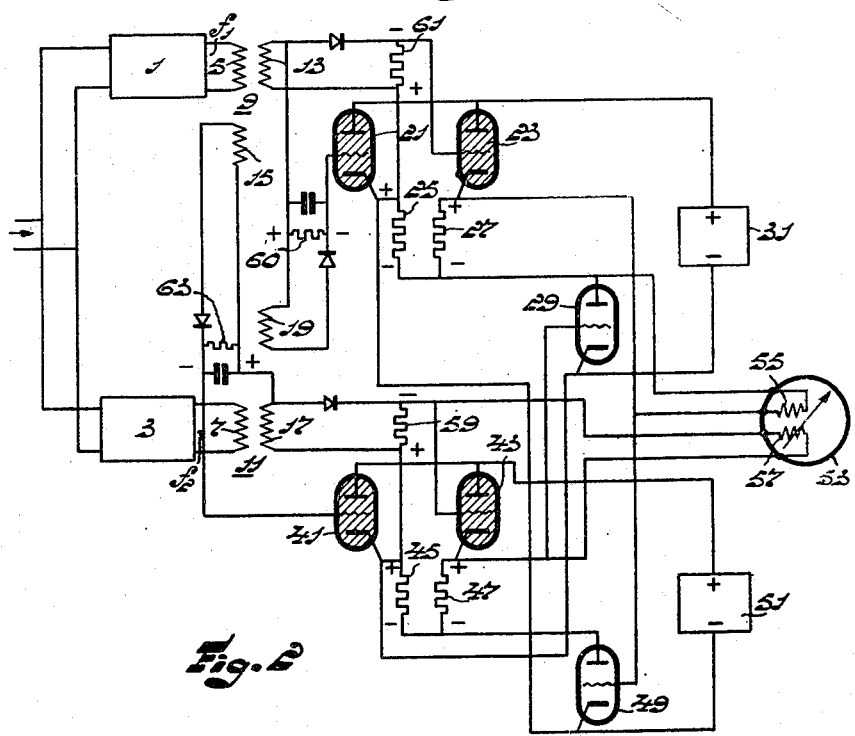
Fig. 2
Fig. 3
INVENTOR
F. DE FREMERY
BY
AGENT Oct. 18, 1949.  F. DE FREMERY  2,485,365
METHOD OF DIRECTION FINDING BY MEANS
OF ROTATING RADIO BEACONS
Filed Feb. 11, 1947  2 Sheets-Sheet 2
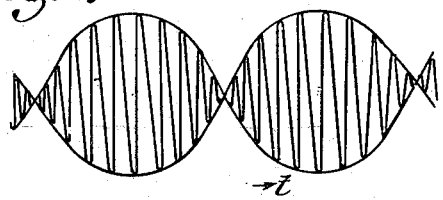
Fig. 5.
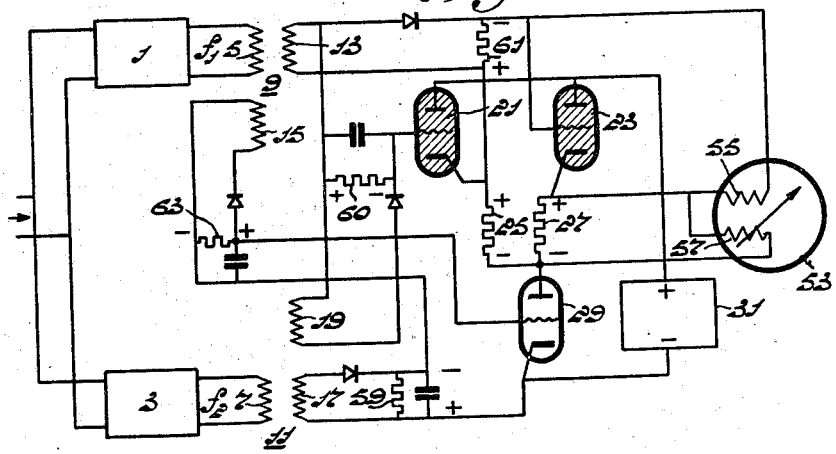
Fig. 4.
Fig. 6.
INVENTOR
FRANK DE FREMERY
BY
AGENT Patented Oct. 18, 1949

2,485,365

UNITED STATES PATENT OFFICE 2,485,365

METHOD OF DIRECTION FINDING BY MEANS OF ROTATING RADIO BEACONS

Frank de Fremery, Eindhoven, Netherlands, assignor to Hartford National Bank and Trust Company, Hartford, Conn., as trustee Application February 11, 1947, Serial No. 727,767
In the Netherlands March 6, 1944

Section 1, Public Law 690, August 8, 1946
Patent expires March 6, 1964

7 Claims. (Cl. 343—106)

This invention relates to a direction finding method by means of rotating radio beacons, according to which a beacon transmitter emits a steadily rotating, modulated radiation having a marked minimum direction and, when the said minimum direction passes a definite orientation direction for instance direction north-south, a preferably non-directional orientation signal, the angle formed by the line extending between a receiver and the radio beacon and the direction of orientation being derived on the receiver side from the time elapsing between the orientation signal and the minimum reception.

In methods of this kind the drawback is experienced that as a rule, the moment of minimum reception cannot be exactly determined. If, in effect, the receiver is at a comparatively great distance from the transmitter the strength of the incoming signal falls below the disturbance level before reaching the minimum and the reception strength exceeds the disturbance level again only a short time after passing the minimum. Due to this the observed minimum becomes blurred, so that exact determination of the direction to be found is not feasible without the need for other means.

To avoid this drawback it is known to determine both the moment at which the signal becomes inaudible and the moment at which the signal becomes audible again and to choose as a correct value the moment midway these two moments. In the methods hitherto known, however, this is effected in a complicated manner.

Another drawback of the conventional methods is that short disturbances having a comparatively large amplitude may act falsely as the orientation signal and thus cause operating difficulties and incorrect indications.

Furthermore a rotating beacon is known, in which directional radiations are alternately emitted in the rhythm of complementary signs and the moment at which the (rotating) line, on which the signs are of equal strength, passes the receiver, is determined with respect to the moment of transmission of an orientation signal. To avoid inaccuracy the signs of one kind, which occur between the orientation signal and the moment at which the signs are no longer distinguishable, are counted, similarly to the number of signs of the other kind occurring between the moment at which the signs become distinguishable again and another orientation signal, the two numbers being subtracted from each other. This method has the drawback that the direction cannot be determined accurately, since the signs must be transmitted with a comparatively low frequency. Due to this each sign corresponds with an angle of say 6°, so that a greater accuracy than about 6° is not feasible. Moreover, the counting and subtracting of the numbers of signs from each other require complicated devices which act very slowly and do not permit continuous reading.

The invention has for its object to provide a method of direction finding by means of rotating radio beacons, and an associated direction finding receiver, in which the said drawbacks are avoided. To this end according to the invention, in a method of the kind set out in the preamble the frequency of the modulation signal is altered and the frequency of the modulation signal in another direction of orientation is restored to its initial value, while on the receiver side the temporary distance between the orientation signal and the moment at which the strength of the incoming signal falls below a definite value, and the temporary distance between the moment at which the strength of the incoming signal exceeds the said definite value and the orientation signals are determined, the angle formed by the line receiver-radio beacon and the direction of orientation being derived either from the sum or the difference of these time intervals.

The two directions, in which the modulation frequency is altered, preferably differ 180° from each other.

In order that the invention may be clearly understood and readily carried into effect it will now be described more fully with reference to the accompanying drawing, given by way of example, wherein Fig. 1 serves to explain the principle on which the invention is based.

Fig. 2 shows a form of construction of a detail of a direction finding receiver according to the invention, which is suitable for carrying out the method according to the invention.

Fig. 3 serves to explain the operation of the device shown in Fig. 2.

Fig. 4 represents another form of construction of a detail of a direction finding receiver according to the invention.

Fig. 5 serves to explain the operation of a beacon transmitter which may be used in carrying out the method according to the invention.

Fig. 6 is a block diagram of a beacon transmitter according to the invention.

In Fig. 1 E represents as a function of the time $t$ the voltage which is obtained in the output circuit of a direction finding receiver by making use of a method according to the invention. The beacon transmitter, relative to which the position of the receiver is to be determined, transmits a rotating modulated radiation having two marked minimum directions differing 180° from each other, which may be produced by a frame rotating at such a speed as is feasible in conjunction with the mechanical construction of the frame, for instance at a speed of several revolutions per second. During part of a revolution, preferably during half a revolution, the emitted radiation is modulated by a preferably audio-frequency oscillation having a frequency $f_1$ of say 800 cycles/sec., the modulation during the other half revolution of the radiation having a frequency $f_2$ of say 1200 cycles/sec. In Fig. 1 this is illustrated by different cross-hatching of the two halves of the surface enclosed by the curve OCO, which indicated the voltage variation, and the time axis.

When the minimum of the rotating radiation passes a definite direction of orientation (direction relative to which the position of the receiver is determined), for instance, the direction north-south, the frequency $f_2$ is, according to one feature of the invention, changed to $f_1$; the moment at which this takes place corresponds with the point O in Fig. 1. In another direction of orientation which in the aforesaid case is displaced by 180° with respect to the first-mentioned direction —the modulation frequency is restored to its initial value $f_2$, the two variations of frequency acting as orientation signal i. e. as a signal for indicating the moment at which the minimum passes the direction of orientation.

The curve OCO exhibits two minima, designated P and Q in Fig. 1, resulting from the passing of the two minimum directions through the line connecting the transmitter and the receiver. On a given scale the horizontal distance between points O and P (and of points C and Q) consequently corresponds with the angle $\alpha$ formed by the receiver-beacon line and the first-mentioned direction of orientation (direction north), the horizontal distance PC corresponding with the complement $\beta$ of the angle $\alpha$.

In determining the angle $\alpha$ by measurement of the temporary distance O–P the difficulty is experienced that in taking a bearing of act beacon transmitters or beacon transmitters located at a comparatively large distance, the incoming signal falls below the disturbance level indicated by the dotted line X—Y before reaching the point P, due to which the distance OA instead of the distance OP is measured, so that a definite angle error E occurs. According to one feature of the invention this error is eliminated, since the temporary distance between one of the frequency variations serving as an orientation signal, for instance the radiation corresponding with the point O and the moment-designated A in Fig. 1— at which the intensity of the incoming signal falls below a definite level, for instance the disturbance level X—Y, and in addition the temporary distance between the moment (point B) at which the strength of the incoming signal exceeds again the said value (level XY) and one of the orientation signals for instance the signal corresponding with point C, are determined.

In this case the temporary distances $OA = \alpha - \epsilon$ and $BC = \beta - \epsilon$ have been measured, as appears from Fig. 1. By subtracting these distances from one another we have $\alpha - \epsilon - (\beta - \epsilon) = \alpha - \beta = \alpha - (180 - \alpha) = 2\alpha - 180°$ from which $\alpha$ can be determined.

It is obvious that when making use of a beacon with a rotating radiation having two marked minimum directions which differ 180° from each other, a variation of the incoming voltage corresponding to the curve OPC will be obtained during the occurrence of the frequency $f_2$. Consequently, it is also feasible to measure, instead of OA or OB the corresponding time interval CD and EO respectively, in which occurs the frequency $f_2$.

Fig. 2 represents the principal part of a receiving device, in which we proceed in the last-mentioned manner for determining the position (azimuth) of the device with respect to a beacon transmitter. The oscillations emitted by this transmitter are amplified and detected by the receiver proper (not represented), of any conventional design, and the low frequency oscillation thus obtained is then supplied to two band-pass filters 1 and 3 designed for solely transmitting the frequency $f_1$ and $f_2$ respectively. The circuit of the filter 1 and 3 respectively is connected to the primary winding of a transformer 9 and 11 respectively comprising two secondary windings 13, 15 and 17, 19 respectively each of which is connected with a normal rectifying circuit comprising a rectifier e. g. contact detector and a load resistance shunted by a condenser. Furthermore the upper part of the circuit which is associated with filter 1, comprises two controllable gas-discharge tubes, for instance two gas-filled triodes 21 and 23, whose cathode leads include cathode resistances 25 and 27 respectively, whose free ends are connected together and to the anode of a high-vacuum tube, for instance a triode 29. The anodes of tubes 21 and 23 are connected together and furthermore to the positive terminal of a source of potential 31 feeding the anode, the negative terminal of this source of potential being connected to the cathode of tube 29.

The lower part of the circuit, which is associated with filter 3, comprises two gas-filled triodes 41 and 43 having cathode resistances 45 and 47, which are connected in quite the same way as referred to above, which tubes can be fed by a source of potential 51 through a high-vacuum triode 49. The tube 29 and 49 respectively is controlled by the voltage set up across the series-connection of the resistances 25, 27, and 45, 47 respectively.

The device shown in Fig. 2 furthermore comprises a differential measuring instrument 53, one coil (57) of which is connected in parallel with the series-connection of the resistances 45 and 47 and the load resistance 59 of the rectifier connected to the winding 17.

The operation of the aforesaid device is as follows. From the moment (O in Fig. 1), at which the frequency is brought from the value $f_2$ to the value $f_1$, an alternating voltage having a frequency $f_1$ is supplied to the input circuit of the tube 21 through a connecting lead by which the upper end of the winding 13 of the transformer 9 is connected to the grid of tube 21 through the load resistance 60 of the rectifier associated with the winding 19 of the transformer 11, and a connecting lead between the cathode of tube 21 and the remaining end of the winding 13, as a result of which tube 21 is ignited, it being provisionally assumed that the tube 29 is conductive. At the same time a direct voltage is set up across the load resistance 61 of the rectifier associated with winding 13, which resistance is connected on the one hand to the cathode of the tube 21 and on the other hand to the grid of tube 23, the said direct voltage being equal and opposite to the voltage set up, due to the cathode current of tube 21, at the cathode resistance 25 and being supplied, in series with the last-mentioned voltage to the input circuit of tube 23. The sum of these voltages is zero and the tube 23 is adjusted in such a manner that no ignition takes place in this case. At the moment designated A in Fig. 1 the counter voltage across resistance 61 disappears, so that in this case the voltage set up across the resistance 25 is supplied with positive polarity to the grid of tube 23, as a result of which this tube ignites.

Since the gas triodes 21 and 23 once having been ignited, are further insensitive to grid-control, this state is maintained till the moment designated C in Fig. 1, at which the modulation frequency acquires the value $f_2$. In fact, the voltage set up at the winding 17 of the transformer 11 is then supplied, in quite the same way as referred to above, through the load resistance 63 of the rectifier connected to the winding 15, to the grid of the gas-filled tube 41, as a result of which this tube ignites. The resulting voltage across the cathode resistance 45 of the tube is supplied with negative sign through the resistance 47 to the grid of tube 29, due to which this tube is blocked and the anode voltage supply of tubes 21 and 23 is interrupted, so that the two tubes become extinguished.

In the manner explained in regard to tubes 21 and 23 the tube 43 becomes conductive at the moment corresponding with point D, as a result of which the blocking of tube 29 is removed at the same time by the voltage set up across the cathode resistance 47, which resistance is equal but opposite to the blocking voltage across the resistance 45 and compensate for it, so that the upper part of the circuit is ready to respond to the frequency $f_1$.

In Fig. 3 the full lines indicate the periods during which a voltage is set up at the resistances 61, 25, 27, 59, 45 and 47 during each revolution of the beacon and a current flows through the coils 55 and 57 of the measuring instrument 53, at the resistances the polarity of the voltage occurring is indicated by + and — signs relatively to the grid of the tube 23 and 47 resp. As appears from this figure a current passes through coil 55 during a period corresponding with the angle $\beta$ plus half the width $\epsilon$ of the minimum AB, the current period of coil 57 corresponding with the angle $\beta$, less $\epsilon$. By connecting the two coils in such a manner that their fields support each other an intermitten indication is obtained which, if the moving system of the instrument 53 has sufficient inertia, is sufficiently constant to be read off and is a measure of $\beta+\epsilon+\beta-\epsilon=2\beta$, a suitable calibration of the scale of the instrument permitting the direction angle $\beta$ to be directly read off.

The windings 15 and 19 and the rectifiers connected thereto serve to prevent disturbances in the operation of the aforesaid device on account of disturbing signals having a comparatively large amplitude, for instance atmospherics. Such signals usually have a very broad frequency spectrum which mostly includes both the frequency $f_1$ and the frequency $f_2$. One of the two frequencies disturbs. If, for instance during the period EO when the tube 29 is no longer blocked, the frequency $f_1$ abruptly occurs, the tube 21, in the absence of winding 15, would ignite unseasonably, which would involve premature blocking of the tube 29, extinction of tubes 41 and 47 and wrong indicating of the instrument 53. This is obviated by providing the aforesaid circuit with expedients preventing response to the other frequency during the occurrence of each of the two frequencies. For instance, in the form of construction referred to interference by the frequency $f_1$ during the normal occurrence of the frequency $f_2$ is avoided by the winding 19 and the rectifier connected thereto. In effect, during the occurrence of the frequency $f_2$ a voltage is set up at the load resistance 69 of the rectifier, which voltage is supplied with a negative polarity to the grid of the tube 21 and blocks this tube, as a result of which the circuit part sensitive to the frequency $f_1$ is no longer capable of responding at all. In quite the same way response to the frequency $f_2$ during the occurrence of $f_1$ is prevented by the winding 15 and the rectifier connected thereto, since in this period a voltage blocking the tube 41 is set up at the resistance 63.

To afford suitable protection against disturbances it is necessary that the periods, in which the frequency $f_1$ and $f_2$ appear, succeed as closely as possible, since no protection is obtained in the absence of both frequencies. As an alternative the two periods may overlap each other, provided periods are left in which each of the two frequencies appears alone.

In using the circuit shown in Fig. 2 only one complete measurement of the direction angle is made per revolution of the rotary beacon. To obtain two complete measurements per revolution the measuring instrument 53 in Fig. 2 may be equipped with an additional coil (not represented), which has the same function as coil 57 but is connected in parallel with the series-connection of resistance 27, 25 and 61 and comprises an additional coil, which has the same function as that of coil 55 but is connected in parallel with the resistance 47. After what has been said above it is prefectly clear that by these additional coils the temporary distances BC and DO are measured respectively, so that in this case a measurement of the value $$AB+BC=\beta+\epsilon+\beta-\epsilon=2\beta$$

is obtained during the first half revolution and a measurement of the value $$DO+EO=\beta+\epsilon+\beta-\epsilon=2\beta$$

is obtained during the second half revolution, in other words two complete measurements of the angle $\beta$ take place per revolution. This yields a steadier indication of the meter 53 at the same frequency of revolution of the beacon.

It is to be noted that it also feasible to transmit one of the two modulating frequencies for instance the frequency $f_2$ in an undirectional manner, in which case a measurement takes place only during the half revolution in which the frequency $f_1$ appears. A simplified receiving circuit arrangement, which may be used in this case, is represented in Fig. 4. This circuit arrangement corresponds both externally and also in regard to its operation substantially to the circuit shown in Fig. 2, but for the difference that the tubes 41, 43 and 49 and the associated resistances 45, 47 and the source of potential 51 are missing. The required blocking of tube 21 on the occurrence of the frequency $f_2$ is now achieved by supplying the voltage, which is set up by the frequency $f_2$ at the resistance 59 with a negative polarity to the tube 29.

The circuit-arrangement shown in Fig. 4 may also be used with advantage for the method according to the invention, according to which both of the frequencies $f_1$ and $f_2$ are transmitted in a directional manner and the emitted radiation, on which these two frequencies are alternately modulated, has only one minimum direction. By means of the represented circuit a measurement is obtained only in a semicircle sector viz. in that wherein the frequency $f_1$ occurs, whereas in a receiver located in the other semicircle sector the pointer remains in the zero position. When the two filters 1 and 3 are interchanged an indication is obtained only if the receiver is located in the other semicircle sector, in other words the position of the filters, in which an indication is obtained points out in what semicircle sector the receiver is relative to the beacon. Therefore the receiver preferably comprises switching-over means (not represented in Fig. 4 for an easy view) for interchanging the frequencies to which the tubes 21 and 29 respond, for instance a switch for interchanging the filters 1 and 3, an indicator being provided which indicates the position of the switch and consequently the semicircle in which the receiver is relatively to the beacon.

Instead of emitting the rotatory radiation by means of a mechanically rotating beacon, it may also be emitted by means of a suitable device for producing an electric rotating field. Such a device may, as illustrated in Fig. 6, comprise two frame antennae 70 and 71 placed at right angles to one another, to which a modulated high-frequency carrier wave (having a frequency $w$) are supplied with carrier wave suppression through a sinusoidal oscillation having the rotation frequency $p$ of the radiation in such a manner that the modulations in the two frames are displaced 90° with respect of one another. As shown in Fig. 6, the high-frequency carrier wave of frequency $w$ is derived from an oscillator 72 and is combined in a modulator 73 alternately with modulation oscillations having a frequency $f_1$ and with modulation oscillations having a frequency $f_2$ yielded by sources 74 and 75, respectively. Alternation of the modulation oscillations $f_1$ and $f_2$ applied to modulator 73 is effected by commutator 76 of any conventional design. Rotation oscillations having a frequency $p$ are taken from a source 77 whose output is separately combined in balance modulators 78 and 79 with the modulated carrier wave yielded by modulator 73, the balance modulators effecting carrier suppression. A 90° phase shifting device 80 is interposed between source 77 and balanced modulator 79 so that the rotation oscillations of frequency $p$ applied to balance modulators 78 and 79 are 90° out of phase. In this case the two oscillations may be represented by $A \sin. wt \sin. pt$ and $A \sin. wt \cos. pt$ A field strength proportional to $A \sin. wt \sin. pt \cos. \alpha + A \sin. wt \cos. pt \sin. \alpha = A \sin. wt \sin. (pt+\alpha)$ is obtained at an angle $\alpha$ with the plane of the first frame. The form of this oscillation corresponds to the curve represented in Fig. 5, the phase, and consequently the moment at which the minimum occurs, depending, similarly to the field produced by a mechanically rotating beacon, on the direction angle. In the system illustrated in Fig. 6, device 76 is driven by a motor 81 which also acts to control the frequency of a rotation oscillator 77, whereby synchronism is maintained between the frequency of oscillator 77 and the commutation of oscillators 74 and 75 by device 76.

What I claim is:

1. The method of radio direction finding at a receiving site in a beacon system wherein a rotating radiation pattern having a distinct minimum is emitted, said radiation being provided with a modulation signal whose frequency is altered at the instant said rotating pattern passes through a first reference direction and is restored to its original value at the instant the pattern passes through a second reference direction, comprising the steps of receiving said radiation to derive said modulation signal therefrom, indicating said signal to determine the time interval between the moment at which the frequency of said signal is altered and the instant at which the strength of said signal falls below a predetermined value, indicating said signal to determine the time interval between said moment and the instant at which the strength of said signal exceeds said predetermined value, and combining said indications to provide a resultant indication of the time interval between said moment and the instant at which said minimum is aligned with said receiving site, the last mentioned time interval providing an index to the orientation of said receiving site relative to said transmitting site.

2. The method of radio direction finding at a receiving site in a beacon system wherein a rotating radiation pattern having a distinct minimum is emitted at a transmitting site, said radiation beng provided with a modulation signal whose frequency is altered at the instant said rotating pattern passes through a first reference direction and is restored to its original value at the instant the pattern passes through a second reference direction, one of said frequencies being transmitted in a nondirectional manner, comprising the steps of receiving said radiation to derive said modulation signal therefrom, indicating said signal to determine the time interval between the moment at which the frequency of said signal is altered and the instant the strength of said signal falls below a predetermined value, indicating said signal to determine the time interval between said moment and the instant the strength of said signal exceeds said predetermined value, and combining said indications to provide a resultant indication of the time interval between said moment and the instant at which said minimum is aligned with said receiving site, the last mentioned time interval providing an index to the orientation of said receiving site relative to said transmitting site.

3. The method of radio direction finding at a receiving site in a beacon system wherein a rotating radiation pattern having a distinct minimum is emitted at a transmitting site, said radiation being provided with a modulation signal whose frequency is altered at the instant when said rotating pattern passes through a first reference direction and is restored to its original value at the instant the pattern passes through a second reference direction, said second reference direction being displaced 180° from said first reference direction, comprising the steps of receiving said radiation to derive said modulation signal, indicating said signal to determine the time interval between the moment at which the frequency of said signal is altered and the instant the strength of said signal falls belows a predetermined value, indicating said signal to determine the time interval between said moment and the instant the strength of said signal exceeds said predetermined value, and combining said indications to provide a resultant indication of the time interval between said moment and the instant at which said minimum is aligned with said receiving site, the last mentioned time interval providing an index to the orientation of said receiving site relative to said transmitting site.

4. The method of radio direction finding comprising the steps of transmitting at a first site a continuously rotating radiation pattern having a distinct minimum, said radiation being provided with a modulation signal whose frequency is altered at the instant said rotating pattern passes through a reference direction and is restored to its original value at the instant the pattern passes through an opposing reference direction, receiving said radiation at a second site to derive said modulation signal, indicating said signal to determine the time interval between the moment at which the frequency of said signal is altered and the instant at which the strength of said signal falls below a predetermined value, indicating said signal to determine the time interval between said moment and the instant at which the strength of said signal exceeds said predetermined value, and combining said indications to provide a resultant indication of the time interval between said moment and the instant at which said minimum is aligned with said receiving site, the last mentioned time interval providing an index to the orientation of said second site relative to said first site.

5. In a radio beacon system wherein a rotating radiation pattern having a distinct minimum is transmitted, said radiation being provided with a modulation signal component whose frequency is altered at the instant said pattern passes through a first reference direction and is restored to its original value at the instant the pattern passes through a second reference direction, direction-finding receiving apparatus comprising detection means for said radiation to derive said modulation signal, means coupled to the output of said detection means and responsive to said signal to indicate the time interval between the moment at which the frequency of said signal is altered and the instant at which the strength of said signal falls below a predetermined value, means coupled to the output of said detection means and responsive to said signal to indicate the time interval between said moment and the instant at which the strength of said signal exceeds said predetermined value, and means to combine said indications to provide an index of direction.

6. In a radio beacon system wherein a rotating radiation pattern having a distinct minimum is transmitted, said radiation being provided with a modulation signal component whose frequency is altered at the instant said pattern passes through a first reference direction and is restored to its original value at the instant the pattern passes through a second reference direction, direction-finding receiving apparatus comprising detector means for said radiation to derive said modulation signal, means coupled to said detector and responsive to said signal to provide a first step voltage commencing at the moment in which the frequency of said signal is altered and terminating at the instant in which the strength of said signal falls below a predetermined value, means coupled to said detector and responsive to said signal to provide a second step voltage commencing at said moment and terminating at the instant in which the strength of said signal exceeds said predetermined value, and means to combine said step voltages to provide an indication of the orientation of said receiving apparatus.

7. Receiving apparatus, as set forth in claim 6, wherein said means to combine said step voltages includes a differential meter having first and second coils, each of said step voltages being applied to a respective coil.

FRANK DE FREMERY.

REFERENCES CITED

The following references are of record in the file of this patent:

UNITED STATES PATENTS

| Number | Name | Date |
|---|---|---|
| 2,184,843 | Kramer | Dec. 26, 1939 |
| 2,297,395 | Erben | Sept. 29, 1942 |
| 2,308,019 | Morawetz | Jan. 12, 1943 |